(12) United States Patent
Nishimura et al.

(10) Patent No.: US 8,469,162 B2
(45) Date of Patent: Jun. 25, 2013

(54) SHOCK ABSORBER

(75) Inventors: Makoto Nishimura, Hachioji (JP); Jin Yamasaki, Ayase (JP); Shinichi Kagawa, Ayase (JP); Tetsuo Yoshida, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 106 days.

(21) Appl. No.: 13/246,262

(22) Filed: Sep. 27, 2011

(65) Prior Publication Data
US 2012/0073918 A1 Mar. 29, 2012

(30) Foreign Application Priority Data

Sep. 29, 2010 (JP) .................................. 2010-218961
Mar. 31, 2011 (JP) .................................. 2011-079152

(51) Int. Cl.
*F16F 9/32* (2006.01)

(52) U.S. Cl.
USPC .................. 188/266.2; 188/266.1; 188/266.5; 188/266.6; 188/314; 188/315; 188/322.2; 188/322.19; 137/315.03; 137/507; 137/510; 251/147; 251/148; 285/201; 285/202; 285/203; 285/204; 285/211; 403/244; 403/245; 403/263

(58) Field of Classification Search
USPC .............. 188/322.2, 322.19, 322.21, 322.13, 188/266.2, 266, 266.6, 281, 315, 318, 313, 188/299, 322, 282.4, 266.3, 269; 137/854, 137/507, 510, 315.03; 29/434; 285/201–203, 285/204, 211; 403/244, 245, 263
See application file for complete search history.

(56) References Cited

U.S. PATENT DOCUMENTS

| | | | | |
|---|---|---|---|---|
| 5,960,915 A | * | 10/1999 | Nezu et al. | 188/266.6 |
| 6,155,391 A | * | 12/2000 | Kashiwagi et al. | 188/266.6 |
| 6,283,259 B1 | * | 9/2001 | Nakadate | 188/322.2 |
| 2011/0073424 A1 | * | 3/2011 | Murakami | 188/322.13 |

FOREIGN PATENT DOCUMENTS

JP 11-159563 6/1999

* cited by examiner

*Primary Examiner* — Robert A Siconolfi
*Assistant Examiner* — San Aung
(74) *Attorney, Agent, or Firm* — Wenderoth, Lind & Ponack, LLP

(57) ABSTRACT

A piston with a piston rod coupled thereto is inserted in a cylinder, which sealingly contains oil. An oil flow generated by movement of the piston is controlled by a damping force generation mechanism, thereby generating a damping force. A separator tube is disposed around the cylinder, and the oil is transmitted to the damping force generation mechanism through a branch tube integrally formed on a cylindrical sidewall of the separator tube. The branch tube is tapered at the outer circumferential portion thereof with the outer diameter thereof reducing toward the distal end of the branch tube.

11 Claims, 3 Drawing Sheets

SHOCK ABSORBER

BACKGROUND OF THE INVENTION

The present invention relates to a shock absorber configured to generate a damping force by controlling a flow of hydraulic fluid in a cylinder during a stroke of a piston rod.

For example, Japanese Patent Public Disclosure No. Hei 11-159563 discloses a cylindrical shock absorber mounted on a suspension apparatus of a vehicle such as an automobile. This shock absorber includes a cylinder, and a cylindrical member disposed around the cylinder to thereby define an annular passage between the cylinder and the cylindrical member. Further, the cylindrical member includes a cylindrical protrusion radially outwardly formed on the sidewall of the cylindrical member, so that a branch tube in communication with the annular passage is integrally formed on the sidewall of the cylindrical member.

As disclosed in Japanese Patent Public Disclosure No. Hei 11-159563, in the shock absorber provided with the branch tube integrally formed on the sidewall of the cylindrical member to use it as a passage of hydraulic fluid, the cylindrical member and the branch tube should be sufficiently pressure-resistant to bear highly pressurized hydraulic fluid, and at the same time, should have a reduced wall thickness to achieve a lightweight structure.

SUMMARY OF THE INVENTION

An object of the present invention is to provide a shock absorber including a cylinder, and a highly pressure-resistant and sufficiently thinned separator tube disposed around the cylinder and including a cylindrical side wall, which defines an annular passage allowing a flow of hydraulic fluid between the side wall of the cylinder and the cylindrical side wall of the separator tube, and a branch tube radially outwardly protruding from the sidewall of the separator tube.

To achieve the forgoing and other objects, an aspect of the present invention is a shock absorber, which is configured to be mounted between two relatively movable members, including a cylinder sealingly containing hydraulic fluid, a piston inserted in the cylinder, a piston rod coupled to the piston and extending to the outside of the cylinder, an outer cylinder disposed around the cylinder, and a separator tube disposed around the cylinder. The separator tube includes a cylindrical sidewall defining an annular passage between the cylinder and the separator tube. The annular passage is in communication with the interior of the cylinder. The shock absorber further includes a reservoir formed outside the separator tube within a space between the cylinder and the outer tube. The reservoir sealingly contains the hydraulic fluid and gas. The shock absorber further includes a branch tube integrally formed on the cylindrical sidewall of the separator tube. The branch tube substantially cylindrically protrudes toward the radially outer side to define a passage in communication with the annular passage. The shock absorber further includes a damping force generation mechanism disposed outside the outer cylinder, and a connection tube extending from the damping force generation mechanism to be fitted in the branch tube with an annular seal disposed around the connection tube. The branch tube is formed on the cylindrical sidewall of the separator tube by drawing processing. The branch tube includes a curved portion and a cylindrical portion. The curved portion is formed on a proximal end of the branch tube so as to have curved inner and outer circumferences. The cylindrical portion is formed continuously from the curved portion toward a distal end of the branch tube so as to have a constant inner diameter. The outer diameter of the cylindrical portion is gradually reduced from the proximal end side toward the distal end side.

Another aspect of the present invention is a separator tube for a shock absorber. The separator tube is disposed around a cylinder sealingly containing hydraulic fluid. The separator tube includes a cylindrical sidewall defining an annular passage between the cylinder and the separator tube. The annular passage is in communication with the interior of the cylinder. The separator tube further includes a branch tube integrally formed on the cylindrical sidewall and substantially cylindrically protruding toward the radially outer side so as to define a passage in communication with the annular passage. The branch tube is formed on the cylindrical sidewall of the separator tube by drawing processing. The branch tube includes a curved portion and a cylindrical portion. The curved portion is formed on a proximal end of the branch tube so as to have curved inner and outer circumferences. The cylindrical portion is formed continuously from the curved portion toward a distal end of the branch tube so as to have a constant inner diameter. The outer diameter of the cylindrical portion is gradually reduced from the proximal end side toward the distal end side.

DETAILED DESCRIPTION OF THE INVENTION

Figure 1:
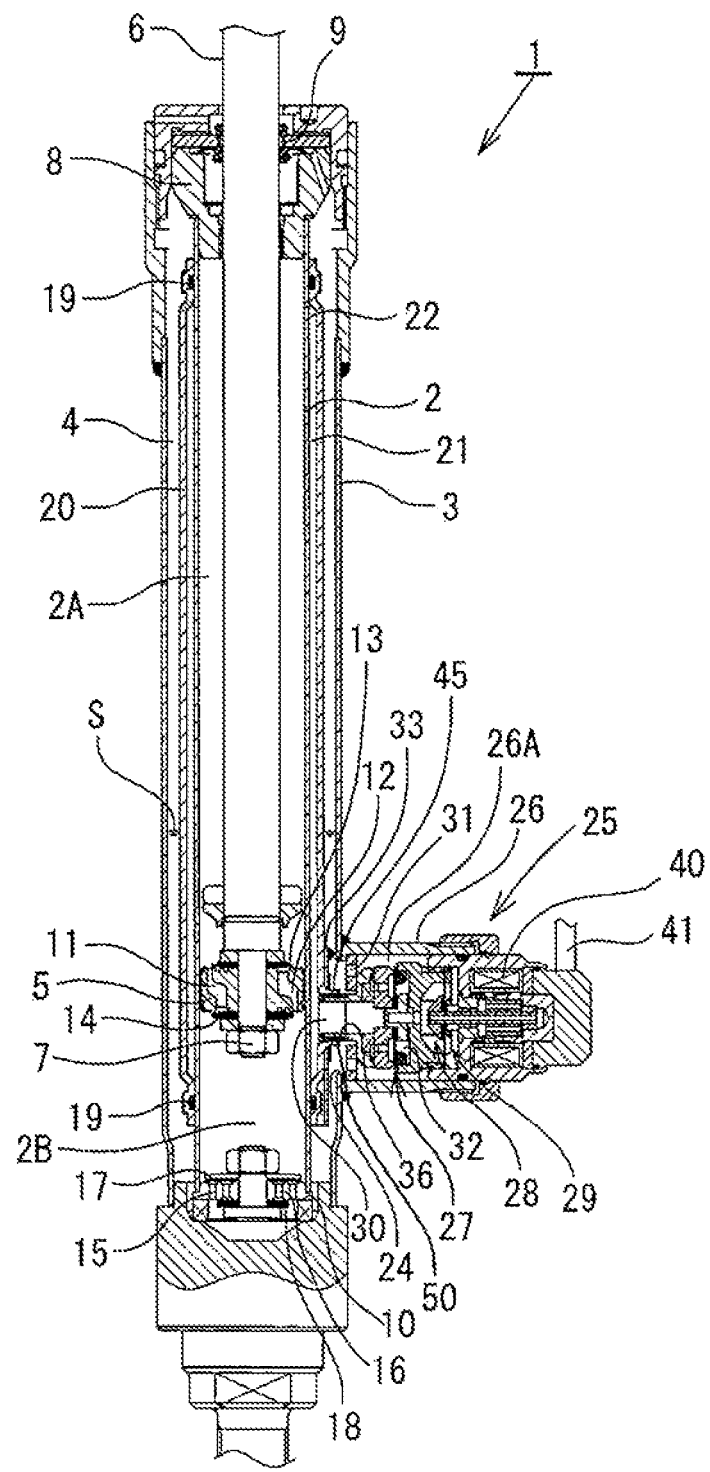
FIG. 1 illustrates a vertical cross-sectional view of a shock absorber according to an embodiment of the present invention.

Hereinafter, embodiments of the present invention will be described in detail. What these embodiments address is not limited to the above-described problems and advantageous effects, but rather, they are expected to answer various other unsolved problems and various other desired effects. Before starting a detailed description of the embodiments, major ones of problems that the embodiments can provide a solution are briefly introduced, although some of them may overlap the already mentioned ones.

[Increase in Damping Force]

In recent years, there has been a growing demand for shock absorbers capable of generating a further increased damping force. This is because, when a vehicle has such a motion that the vehicle body leans in one direction, such as rolling or pitching, an increased damping force helps in controlling the motion of the vehicle body to regain a stabilized running state. However, an increased damping force causes generation of a high pressure in the cylinder, and thereby generation of a large pressure difference between the pressure in the reservoir and the pressure in the cylinder, leading to such a problem that application of a stress is concentrated on the joint between the cylindrical member and the branch tube and this situation adversely affects the pressure resistance of the shock absorber.

[Improvement of Damping Force Characteristic]

As discussed in the above-described patent literature, Japanese Patent Public Disclosure No. Hei 11-159563, shock absorbers are subject to the problem of aeration occurrence. Oil and gas are sealingly contained in the reservoir, and a jet flow of the oil from the damping force generation mechanism into the reservoir causes generation of whirls and air bubbles in the vicinity of the fluid surface of the oil in the reservoir, leading to occurrence of aeration. Since a shock absorber with aeration occurring therein cannot generate a stabilized damping force, this problem should be solved to improve the damping force characteristic. One possible measure against this problem is to provide a baffle plate around the inflow port through which the oil is injected from the damping force generation mechanism into the reservoir, thereby dampening a stream of the jet flow. Regarding the baffle plate, it is desirable to attach the baffle plate by a method other than welding so as to improve the assemblability and prevent contamination. Therefore, one proposed method to attach the baffle plate is to utilize the branch tube to fixedly retain the baffle plate, but this requires a further increase in the axial length of the branch tube.

[Lightweight Structure]

Parts mounted on an automobile are required to reduce their respective weights as much as possible for the purpose of, for example, the improvement of fuel efficiency. Therefore, the cylinder, the separator tube, and the outer tube are required to have a reduced wall thickness while maintaining a sufficient pressure resistance. Nevertheless, forming a branch tube at a thin member leads to a further thinning of the branch tube portion, making it difficult to satisfy the pressure resistance requirement. One of currently sought major objects for shock absorbers is solving this trade-off by providing a branch tube achieving the reduction in the thickness and the acquirement of the pressure resistance at the same time.

Hereinafter, embodiments of the present invention will be described with reference to the accompanying drawings. As illustrated in FIG. 1, a shock absorber 1 according to an embodiment of the present invention is a cylindrical damping force adjustable hydraulic shock absorber having a double-cylinder structure, and includes a cylinder 2, an outer cylinder 3 disposed around the cylinder 2, and an annular reservoir 4 defined between the cylinder 2 and the outer cylinder 3. A piston 5 is slidably fitted in the cylinder 2 to divide the interior of the cylinder 2 into two chambers, a cylinder upper chamber 2A and a cylinder lower chamber 2B. One end of a piston rod 6 is coupled to the piston 5 by a nut 7. The piston rod 6 extends through the cylinder upper chamber 2A. The other end of the piston rod 6 is inserted through a rod guide 8 and an oil seal 9 attached at the upper ends of the cylinder 2 and the outer cylinder 3, and extends to the outside of the cylinder 2. A base valve 10 is provided at the lower end of the cylinder 2 so as to divide the cylinder lower chamber 2B and the reservoir 4.

The piston 5 includes passages 11 and 12 for establishing communication between the cylinder upper and lower chambers 2A and 2B. Then, a check valve 13 is disposed at the passage 12 for allowing only a flow of fluid from the cylinder lower chamber 2B to the cylinder upper chamber 2A. Further, a disk valve 14 is disposed at the passage 11. The disk valve 14 is configured to be opened when the pressure of the fluid in the cylinder upper chamber 2A reaches a predetermined pressure, and release this pressure to the cylinder lower chamber 2B.

The base valve 10 includes passages 15 and 16 for establishing communication between the cylinder lower chamber 2B and the reservoir 4. Then, a check valve 17 is disposed at the passage 15 for allowing only a flow of fluid from the reservoir 4 into the cylinder lower chamber 2B. Further, a disk valve 18 is disposed at the passage 16. The disk valve 18 is configured to be opened when the pressure of the fluid in the cylinder lower chamber 2B reaches a predetermined pressure, and release this pressure to the reservoir 4. Oil is sealingly contained in the cylinder 2 as hydraulic fluid, and oil and gas are sealingly contained in the reservoir 4.

A separator tube 20 is fittedly disposed around the cylinder 2 through seal members 19 which are disposed at both the upper and lower ends of the cylinder 2. An annular passage 21 is defined between the sidewall of the cylinder 2 and the cylindrical sidewall of the separator tube 20 disposed around the cylinder 2. The annular passage 21 is in communication with the cylinder upper chamber 2A through a passage 22 formed at the sidewall of the cylinder 2 near the upper end of the cylinder 2. A substantially cylindrical branch tube 45 is formed in a protruding manner at the lower portion of the sidewall of the separator tube 20. The branch tube 45 is small in diameter, and includes a connection port 23 which serves as a passage leading to the annular passage 21. Further, a large-diameter inflow port 24 is formed on the sidewall of the outer cylinder 3 substantially concentrically with the branch tube 45. A damping force generation mechanism 25 is attached to the inflow port 24 of the sidewall of the outer cylinder 3.

The damping force generation mechanism 25 includes a cylindrical case 26 attached to the inflow port 24 of the outer cylinder 3. A pilot type (backpressure type) main valve 27, and a pilot valve 28, which is a pressure control valve to be driven by a solenoid for controlling a valve-opening pressure of the main valve 27, are contained in the case 26. Further, a fail valve 29, which functions at the time of a failure, is disposed downstream of the pilot valve 28. Then, a connection tube 30, which defines an inlet passage, is liquid-tightly inserted in the connection port 23 of the branch tube 45. The oil is introduced from the connection port 23 into the connection tube 30, and is transmitted to a chamber 26A surrounded by the case 26 through the main valve 27, the pilot valve 28, and the fail valve 29. The oil in the chamber 26A is transmitted to the reservoir 4 through the passage 31 formed at the end of the case 26 and the inflow port 24 of the outer cylinder 3.

At this time, before the main valve 27 is opened, the pilot valve 28 controls the oil flow to generate a damping force. After the main valve 27 is opened, the main valve 27 mainly generates a damping force. Further, a part of the oil situated upstream of the pilot valve 28 is introduced into a backpressure chamber 32 formed behind the main valve 27, so that the inner pressure thereof is applied to the main valve 27 in the valve-closing direction. Application of electric current to the solenoid 40 through a lead wire 41 can adjust the control pressure of the pilot valve 28, thereby adjusting a damping force. As a result, the inner pressure in the backpressure chamber 32 is changed, which allows adjustments of the valve-opening pressure and the opening degree of the main valve 27. Further, the fail valve 29 is configured to be closed when a vehicle stops at a red light or if ever there is a failure in application of electric current to the solenoid 40, and functions to limit the oil flow instead of the pilot valve 27 which would be set into a constantly opened state in these cases, thereby preventing an excessive drop in the damping force to maintain an appropriate damping force.

Figure 2:
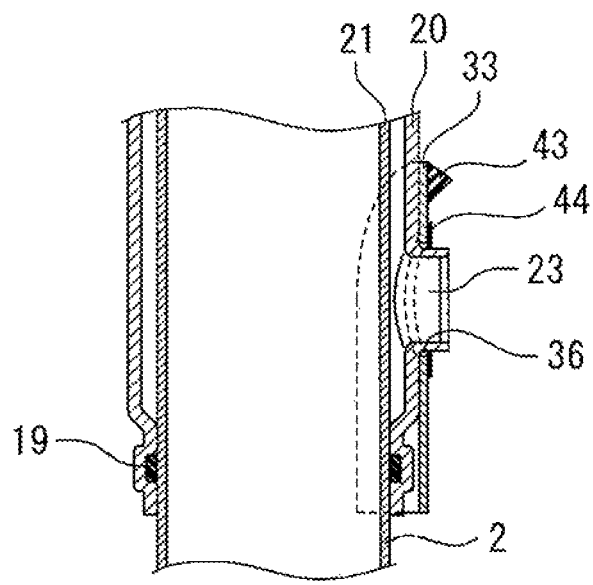
FIG. 2 is an enlarged vertical cross-sectional view illustrating a branch tube portion of a separator tube with a baffle plate attached thereto in the shock absorber illustrated in FIG. 1.
Figure 3:
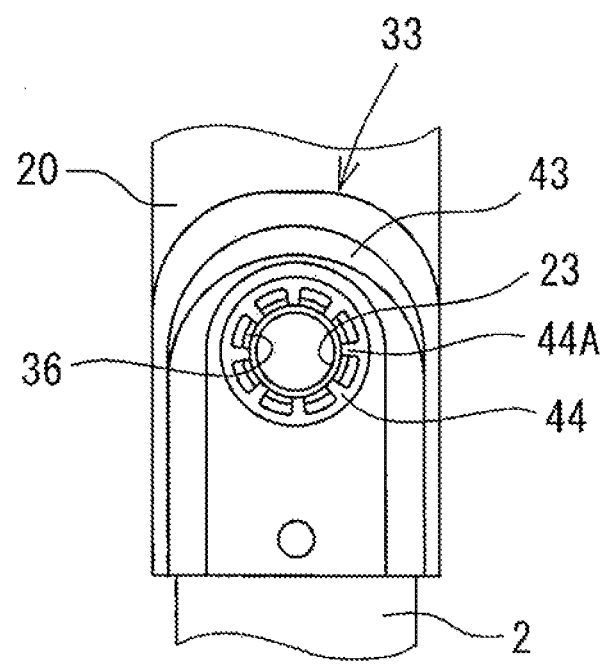
FIG. 3 is a front view of the branch tube portion of the separator tube illustrated in FIG. 2.

A baffle plate 33 as a partition member is disposed in the reservoir 4. The baffle plate 33 is disposed at a portion of the outer circumferential surface of the separator tube 20 which faces the inflow port 24 of the outer cylinder 3. As illustrated in FIGS. 2 and 3, the baffle plate 33 is a plate-shaped member curved along the outer circumferential surface of the separator tube 20. Further, as viewed from the front thereof (FIG. 3), the baffle plate 33 includes a semi-circular upper portion, and a rectangular lower portion extending downwardly from the upper portion. The baffle plate 33 includes an opening 36 as a retaining portion. The branch tube 45 of the separator tube 20 is inserted in the opening 36 of the baffle plate 33. A toothed washer 44 is fitted around the branch tube 45 of the separator tube 20 after the branch tube 45 is inserted in the opening 36 of the baffle plate 33, whereby the baffle plate 33 is fixedly attached to the separator tube 20. The toothed washer 44 includes an inner circumferential portion constituted by an annular spring member, and a plurality of radially extending teeth 44A formed integrally with the inner circumferential portion. The radially extending teeth 44A are deformed to thereby allow the branch tube 45 to be pressed-fitted in the toothed washer 44, and prevent an easy pullout due to the wedging effect once the branch tube 45 is pushed therein. The baffle plate 33 further includes a rubber partition member 43 fixedly attached by baking. The partition member 43 is an elastic seal member disposed so as to define a substantially U shape along the circumference of the upper portion and the side of the baffle plate 33. The partition member 43 has a substantially triangular shape in cross section, and the base of the triangle is fixedly attached to the main body of the baffle plate 33, and the vertex of the triangle is pressed against the inner circumferential surface of the outer cylinder 3 to increase the sealing performance between the baffle plate 33 and the outer cylinder 3 while reducing generation of noises.

Next, the portion of the separator tube 20 where the branch tube 45 is formed will be described in detail with reference to FIG. 4, mainly focusing on its geometric details.

Figure 4:
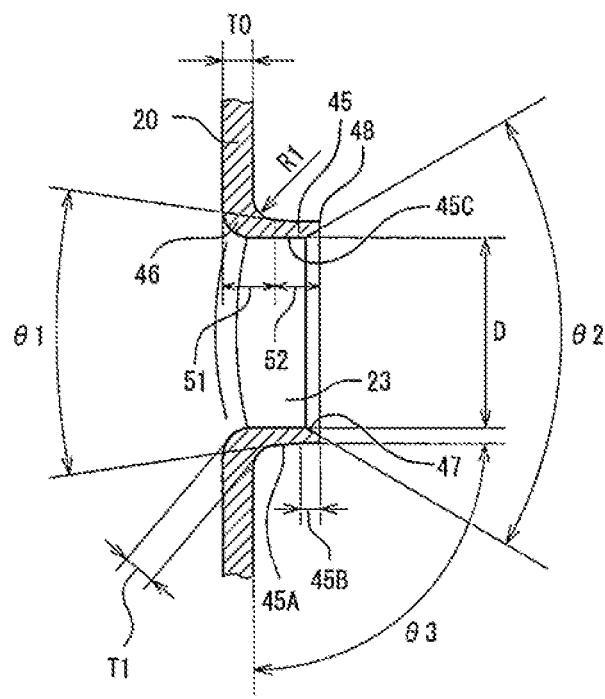
FIG. 4 is a further enlarged vertical cross-sectional view of the branch tube portion of the separator tube illustrated in FIG. 2.

As illustrated in FIG. 4, the substantially cylindrical branch tube 45 is integrally formed on the cylindrical sidewall of the separator tube 20. The substantially cylindrical branch tube 45 protrudes radially outwardly. As a result, a circular opening, which serves as the connection port 23 in communication with the annular passage 21, is formed within the substantially cylindrical branch tube 45. The branch tube 45 has a tapered surface 45A at the outer circumferential portion thereof with the outer diameter thereof reducing toward the tip of the branch tube 45. A taper angle $\theta 1$ of the tapered surface 45A is approximately 16°. If the branch tube 45 is formed by plastic deformation such as drawing, the exact shape of the tapered surface 45A should be a slightly concaved curve along the radially outer portion of the tapered surface 45A as viewed in cross section in the axial direction.

A joint 46 between the tapered surface 45A of the branch tube 45 and the sidewall of the separator tube 20 has a smoothly curved outer circumferential portion rounded into a partial circle of a radius R1.

If the diameter of the separator tube 20 is approximately 40 to 45 mm, and the inner diameter D of the connection port 23 is approximately 12 mm, preferably, the radius R1 of the curve of the outer circumferential portion of the joint 46 is approximately 1.5 mm. Further, the inner circumferential portion of the joint 46 is also smoothly curved by being rounded, and thickness T1 of the joint 46 is substantially equal to the thickness T0 of the sidewall of the separator tube 20.

In the present disclosure, the term "curved portion 51" will be used to refer to the portion having curved inner and outer circumferences in the axial direction of the branch tube 45. Further, the term "cylindrical portion 52" will be used to refer to the portion from the curved portion 51 to the distal end of the branch tube 45 in the axial direction of the branch tube 45.

The outer circumferential portion of the distal end of the branch tube 45 is not tapered, i.e., forms a cylinder portion 45B having a constant outer diameter along the axial direction. Therefore, at the cylindrical portion 52, the ratio of the reduction in the outer diameter at the cylinder portion 45B at the distal end side is smaller than the ratio of the reduction in the outer diameter at the portion having the outer circumference corresponding to the tapered surface 45A at the proximal end side (this ratio is zero at the cylinder portion 45B). However, the cylinder portion 45B may be formed to be tapered in such a manner that the ratio of the reduction in the outer diameter thereof is smaller than that at the proximal end side.

Figure 5:
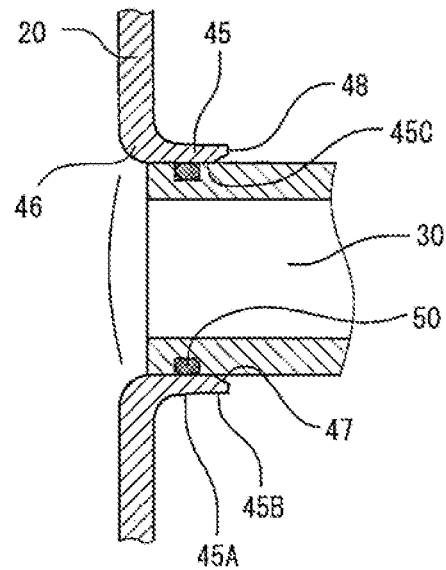
FIG. 5 is a vertical cross-sectional view of a branch portion, which illustrates a variation of a connection tube inserted through the branch tube.

The inner circumferential surface of the cylinder portion 52 of the branch tube 45, which defines the connection port 23, is not tapered, i.e., forms a cylindrical surface 45C having a constant inner diameter along the axial direction. The range of the cylindrical surface 45C corresponds to the entire range throughout which the connection tube 30 illustrated in FIG. 5 is inserted. In other words, the cylindrical surface 45C has no angle so as to receive an insertion of the connection tube 30, which is a pipe having a straight outer circumference, without any gap formed therebetween. The axial length of the cylindrical surface 45C is approximately 3.5 to 4 mm. A chamfered portion 48 is formed at the inner circumferential edge of the distal end of the branch tube 45 by being chamfered to be tapered at a taper angle $\theta 2$. A distal end surface 48 of the branch tube 45 is a flat surface. Further, an angle $\theta 3$, which is defined by the sidewall of the separator tube 20 and the cylinder portion 45B, is set to 90° to improve the assemblability for an insertion of the branch tube 45 into the opening 36 of the baffle plate 33, and to prevent the baffle plate 33 from being pulled off.

The branch tube 45 is integrally formed on the cylindrical surface of the separator tube 20 by drawing according to the following method.

An oval hole is formed on the cylindrical sidewall of the separator tube 20 as a rough hole by, for example, cutting or punching, in such a manner that the hole has a large diameter in the axial direction and a small diameter in the circumferential direction. An outer die is placed at the outer circumferential side of the separator tube 20 and around the oval hole. A punch is applied to the oval hole from the inner circumferential side of the separator tube 20. After that, a pressure is added to the outer die, as a result of which the branch tube 45, which extends toward the outer circumferential side, is formed on the cylindrical sidewall of the separator tube 20. At this time, the tapered surface 45A, the cylinder portion 45B, and the cylindrical surface 45C can be formed into respective desired shapes by appropriately setting the shape of the punch, the shape of the outer die, and the timing of the pressure application. The branch tube 45 is formed by effectively utilizing the thickness of the separator tube 20 in such a manner that the joint 46 has the arched curved portion 51 as its inner and outer circumferences, and the thickness T1 of the curved portion 50 is substantially equal to the thickness T0 of the separator tube 20, so as to obtain a sufficient thickness for the joint 46 which will maximally receive a stress generated by the hydraulic pressure in the cylinder 2. The curved cylindrical surface 45C and the tapered surface 45A are formed at the inner circumferential side and the outer circumferential side, continuously from the joint 46. The portion corresponding to the tapered surface 45A has a thinner thickness than the joint 46.

Then, the thickness of the branch tube 45 is reduced as the branch tube 45 extends along the distance to the distal end of the branch tube 45. In other words, the outer diameter of the branch tube 45 is reduced from the joint 46 at the proximal end side to the distal end side. The inner diameter of the branch tube 45 is constant from the proximal end side to the distal end side. Then, upon an insertion of the connection tube 30, which defines the inlet passage of the damping force generation mechanism 25, into the connection port 23, a seal member 50, which is an annular seal disposed on the outer circumference of the connection tube 30, is brought into contact with the inner circumference of the cylindrical portion 52 to provide a seal therebetween, thereby generating a pressure gradient from the proximal end near the cylinder 2 (the cylinder 2 side) to the distal end side. As a result, a high hydraulic pressure is not applied to the distal side of the branch tube 45 at the sealed portion of the cylindrical portion 52, thereby reducing a stress generated by the hydraulic pressure. Therefore, the cylindrical portion 52 can have a reduced thickness. In other words, the joint 46 should have a thickness capable of enduring a stress generated by the hydraulic pressure, while the outer side of the cylindrical portion 52 beyond the seal member 50 may have any thickness capable of retaining the connection tube 30.

The present embodiment configured as mentioned above functions as follows.

The shock absorber 1 is mounted in such a manner that the end thereof with the piston rod 6 protruding therefrom is positioned at the upper side and the end thereof with the base valve 10 attached thereto is positioned at the lower side, and is arranged between relatively movable members such as the sprung side (vehicle body side) and the unsprung side (wheel side) of a suspension apparatus of a vehicle. The lead wire 41 is connected to a control apparatus.

During an extension stroke of the piston rod 6, a movement of the piston 5 in the cylinder 2 causes the check valve 13 of the piston 5 to be closed. Before the disk valve 14 is opened, the hydraulic fluid in the cylinder upper chamber 2A is pressurized to flow through the passage 22 and the annular passage 21, and is introduced from the connection port 23 of the separator tube 20 into the inlet passage 30 of the damping force generation mechanism 25. Then, the hydraulic fluid introduced from the inlet passage 30 is transmitted into the chamber 26A surrounded by the case 26 through the main valve 27, the pilot valve 28, and the fail valve 29, and further, is introduced into the reservoir 4 through the passage 31 at the end of the case 26 and the inflow port 24 of the outer cylinder 3.

At this time, the hydraulic fluid corresponding to the movement of the piston 5 is introduced from the reservoir 4 into the cylinder lower chamber 2B by opening the check valve 17 of the base valve 10. Further, when the pressure in the cylinder upper chamber 2A reaches the valve-opening pressure of the disk valve 14 at the piston 5, the disk valve 14 is opened to release the pressure in the cylinder upper chamber 2A into the cylinder lower chamber 2B, thereby preventing an excessive increase in the pressure in the cylinder upper chamber 2A.

During a compression stroke of the piston rod 6, a movement of the piston 5 in the cylinder 2 causes the check valve 13 of the piston 5 to be opened, and the check valve 17 at the passage 15 of the base valve 10 to be closed. Before the disk valve 18 is opened, the hydraulic fluid in the piston lower chamber 2B is introduced into the cylinder upper chamber 2A. The hydraulic fluid in the cylinder upper chamber 2A is introduced into the reservoir 4 through the same route as the extension stroke by the amount corresponding to the entry of the piston rod 6 into the cylinder 2. When the pressure in the cylinder lower chamber 2B reaches the valve-opening pressure of the disk valve 18 at the base valve 10, the disk valve 18 is opened to release the pressure in the cylinder lower chamber 2B into the reservoir 4, thereby preventing an excessive increase in the pressure in the cylinder lower chamber 2B.

In this way, during both an extension stroke and an compression stroke of the piston rod 6, the damping force generation mechanism 25 generates a damping force by the pilot valve 28 before the main valve 27 is opened (piston low speed range), and generates a damping force according to the opening degree of the main valve 27 after the main valve 27 is opened (piston high speed range). Further, the damping force can be adjusted by adjusting the control pressure of the pilot valve 28 according to applied current to the solenoid 40, as a result of which the inner pressure in the backpressure chamber 32 is changed to allow adjustments of the valve-opening pressure and the opening degree of the main valve 27. Further, when the vehicle stops at a red light or if ever there is a failure in application of electric current to the solenoid 40, the fail valve 29 is closed to limit an oil flow instead of the pilot valve which would be set in a constantly opened state in these cases, thereby preventing an excessive drop in the damping force to maintain an appropriate damping force.

Due to the provision of the baffle plate 33, the partition member 43 of the baffle plate 33 separates a fluid surface S of the oil in the reservoir 4 from the portion in the reservoir 4 where the oil is introduced after being transmitted from the damping force generation mechanism 25 through the passage 31 and the inflow port 24 of the outer cylinder 3. This can limit or regulate the oil flow into the upper side in the reservoir 4 in use, among the oil flow introduced in the reservoir 4 after being transmitted from the damping force generation mechanism 25 through the passage 31 and the inflow port 24 of the outer cylinder 3. Therefore, it is possible to prevent generation of swirls and air babbles in the vicinity of the fluid surface S which might otherwise be generate by the jet flow of the oil introduced into the reservoir 4 through the inflow port 24, and prevent gas from being blended into the oil in the reservoir 4, thereby obtaining a stabilized damping force with the reduced possibility of aeration and cavitation occurrence.

Further, the baffle plate 33 can ease a sudden increase in the flow passage area of the oil introduced from the damping force generation mechanism 25 into the reservoir 4, thereby easing a sudden increase in the flow rate of the oil due to the inflow into the reservoir 4 to prevent generation of swirls. As a result, it is possible to prevent generation of air babbles following generation of swirls, and blending of gas into the oil, thereby obtaining a stabilized damping force with the reduced possibility of aeration and cavitation occurrence.

The branch tube 45, which defines the connection port 23 of the separator tube 20, is formed in such a manner that the tapered surface 45A is formed at the outer circumferential portion of the branch tube 45, the joint 46 between the branch tube 45 and the sidewall of the separator tube 20 has smoothly curved outer circumference and inner circumference, and the thickness T1 of the joint 46 is substantially equal to the thickness T0 of the sidewall of the separator tube 20. Therefore, it is possible to enhance the strength of the joint 46, and at the same time, reduce a stress applied to the joint 46 due to the differential pressure between the annular passage 21 and the reservoir 4. As a result, it is possible to increase the pressure resistance against the hydraulic fluid, leading to a reduction in the thickness of the separator tube 20, and achievement of a lightweight structure of the shock absorber.

Since the inner circumferential surface of the branch tube 45, which defines the connection port 23, is the not-tapered cylindrical surface 45C, this can prevent a leak of the oil by achieving the required seal performance after the insertion of the connection tube 30 which defines the inlet passage of the damping force generation mechanism 25. The formation of the chamfered portion 47 at the inner circumferential edge of the distal end of the branch tube 45 facilitates an easy insertion of the connection tube 30 during the assembly. Further, the formation of the not-tapered cylinder portion 45B at the outer circumferential portion of the distal end of the branch tube 45 enables engagement of the teeth 44A of the toothed washer 44 with the cylinder portion 45B to establish a sufficient retaining force, when the baffle plate 33 is attached to the branch tube 45 by the toothed washer 44.

According to the conventional arts, one known method to integrally form the branch tube at the cylindrical sidewall of the separator tube is the technique of forming a flat portion at the sidewall of the separator tube, piercingly forming a circular rough hole at the flat portion, and applying the burring processing thereto. This technique can employ a circular rough hole so that a force for the burring processing can be evenly applied along the circumferential direction, thereby increasing the workability. However, this technique has the problem of a reduction in the pressure resistance, since the resulting structure tends to lead to concentrated application of a stress to the joint between the branch tube and the flat portion.

On the other hand, in the present embodiment, the outer circumferential portion of the branch tube 45 is tapered to form the tapered surface 45A, whereby it is possible to prevent the thickness T1 of the joint 46 between the branch tube 45 and the sidewall of the separator tube 20 from being reduced during the drawing processing so that the thickness T1 can be substantially equal to the thickness T0 of the sidewall of the separator tube 20. At this time, the thickness of the distal end of the branch tube 45 is reduced. However, regarding this portion, the connection tube 30 of the damping force generation mechanism 25 is inserted in the connection port 23, and the seal member 50 provides a seal at the joint between the connection tube 30 and the connection port 23, whereby a pressure applied thereto is reduced from the contact point of the seal member 50 at the cylinder side to the contact point of the seal member 50 near the distal end of the branch tube 45 with a pressure gradient generated. Thus the portion of the branch tube 45 at the distal end side, which is out of contact with the seal member 50, does not have to receive a high hydraulic pressure. Therefore, it is possible to obtain the separator tube 20 resistive to a high pressure without requiring a weight increase.

Further, after the formation of the branch tube at the separator tube according to the above-described embodiment, nitriding processing may be applied, so as to further ensure the acquirement of the pressure resistance of the separator tube and the reduction in the thickness of the separator tube without making a trade-off therebetween as much as possible.

Next, an embodiment applying nitriding processing to the separator tube will be described.

The shock absorber 1 includes the cylinder 2, the outer cylinder 3 disposed around the cylinder 2, and the separator tube 20 disposed around the cylinder 2 and having the cylindrical sidewall defining the annular passage in communication with the interior of the cylinder. In this way, the shock absorber 1 has a structure constituted by three cylindrical bodies, and therefore further relates to the problem of an increased weight compared to a mono-tube shock absorber and a twin-tube shock absorber.

Under these circumstances, the inventor has tried to discover any method for achieving a further lightweight structure. During the research, the inventors have found out that the cylinder 2 and the outer cylinder 3 are supposed to receive a lateral force through the piston rod 6, and therefore are required to have a certain strength, leading to an additional difficulty of reducing the thickness thereof. Then, the inventors have further proceeded with the research, and arrived at the idea that a separator tube 20 capable of avoiding direct application of the lateral force may allow the thickness to be reduced. From there, the inventors have noticed that, since the pressure in the separator tube undergoes a major change each time the direction of a stroke is reversed between the extension side and the compression side, it is important to seek the weight reduction of the separator while paying a special attention to the enhancement of fatigue strength of the material as well.

In conclusion, the inventors have considered application of nitriding processing for hardening the surface of the separator tube as a method for enhancing the fatigue strength of the material while reducing the weight by reducing the thickness. The nitriding processing can be embodied by gas soft-nitriding processing or another nitriding processing arbitrarily selected according to, for example, the material of the separator tube and the processing time. The present embodiment employs gas soft-nitriding processing. Hardening the surface layer itself of the base material of the separator tube can increase the fatigue strength to thereby maintain the pressure resistance while reducing the weight by reducing the thickness of the separator tube. Further, reducing the thickness of the separator tube can facilitate the process of forming the rough hole at the sidewall of the separator tube and the process of pressing the punch against the rough hole during the formation of the branch tube, thereby increasing the productivity.

In the above-described embodiment, one tapered surface 45A is formed at the outer circumference of the cylinder portion 52. However, if the branch tube 45 has an elongated axial length, a plurality of tapered surfaces may be formed so as to reduce the ratio of the reduction in the outer diameter at the distal end side in consideration of the pressure gradient of the seal. Further, in this case, the plurality of tapered surfaces may be smoothly connected to define a curved surface as a whole.

Further, if the branch tube 45 has a short axial length, the cylinder portion 45B at the distal end may be omitted.

The above-mentioned embodiment is configured so that the seal member 50 covers the entire outer circumference of the connection tube 30. However, for example, as illustrated in FIG. 5, a seal member 60 may be disposed in an outer circumferential groove formed at the connection tube 30. Even this configuration can maintain the pressure resistance, since a sufficient thickness is obtained at the proximal end side relative to the seal member 60 to which a high pressure is applied.

According to the shock absorber of the above-described embodiments, it is possible to increase the pressure resistance of the separator tube with the branch tube integrally formed thereto, and reduce the thickness thereof at the same time.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2010-218961, filed on Sep. 29, 2010 and No. 2011-079152 filed on Mar. 31, 2011.

The entire disclosure of Japanese Patent Applications No. 2010-218961 filed on Sep. 29, 2010 and No. 2011-079152 filed on Mar. 31, 2011 including specification, claims, drawings and summary is incorporated herein by reference in its entirety.

What is claimed is:

1. A shock absorber configured to be mounted between two relatively movable members, the shock absorber comprising:
    a cylinder sealingly containing hydraulic fluid;
    a piston inserted in the cylinder;
    a piston rod coupled to the piston and extending to the outside of the cylinder;
    an outer cylinder disposed around the cylinder;
    a separator tube disposed around the cylinder, and including a cylindrical sidewall defining an annular passage between the cylinder and the separator tube, the annular passage being in communication with the interior of the cylinder;
    a reservoir formed outside the separator tube within a space between the cylinder and the outer tube, the reservoir sealingly containing the hydraulic fluid and gas;
    a branch tube integrally formed on the cylindrical sidewall of the separator tube, the branch tube substantially cylindrically protruding toward the radially outer side to define a passage in communication with the annular passage;
    a damping force generation mechanism disposed outside the outer cylinder; and
    a connection tube extending from the damping force generation mechanism to be fitted in the branch tube with an annular seal disposed around the connection tube,
    wherein the branch tube is formed on the cylindrical sidewall of the separator tube by drawing processing,
    wherein the branch tube includes a curved portion and a cylindrical portion, the curved portion being formed on a proximal end of the branch tube so as to have curved inner and outer circumferences, the cylindrical portion being formed continuously from the curved portion toward a distal end of the branch tube so as to have a constant inner diameter, and
    wherein the outer diameter of the cylindrical portion is gradually reduced from the proximal end side toward the distal end side.

2. The shock absorber according to claim 1, wherein the branch tube further includes a chamfered portion at the inner circumference of the distal end of the cylindrical portion.

3. The shock absorber according to claim 1, wherein the branch tube further includes, at the distal end side of the cylindrical portion, a portion where the ratio of the reduction in the outer diameter is smaller than the ratio of the reduction in the outer diameter at the proximal end side.

4. The shock absorber according to claim 2, wherein the branch tube further includes, at the distal end side of the cylindrical portion, a portion where the ratio of the reduction in the outer diameter is smaller than the ratio of the reduction in the outer diameter at the proximal end side.

5. The shock absorber according to claim 1, wherein the branch tube further includes a cylinder portion at the distal end side of the cylindrical portion, the cylinder portion having a constant outer diameter along an axial direction.

6. The shock absorber according to claim 2, wherein the branch tube further includes a cylinder portion at the distal end side of the cylindrical portion, the cylinder portion having a constant outer diameter along an axial direction.

7. The shock absorber according to claim 3, wherein the branch tube further includes a cylinder portion at the distal end side of the cylindrical portion, the cylinder portion having a constant outer diameter along an axial direction.

8. The shock absorber according to claim 5, wherein with the shock absorber being mounted between the two members, a partition member is disposed in the reservoir, the partition member including a partition wall adapted to limit a flow of the hydraulic fluid flowing upward from an inflow port leading to the reservoir after being transmitted through the damping force generation mechanism, and
    wherein the partition member includes a retaining portion enabling the partition member to be retained by the cylinder portion.

9. The shock absorber according to claim 6, wherein with the shock absorber being mounted between the two members, a partition member is disposed in the reservoir, the partition member including a partition wall adapted to limit a flow of the hydraulic fluid flowing upward from an inflow port leading to the reservoir after being transmitted through the damping force generation mechanism, and
    wherein the partition member includes a retaining portion enabling the partition member to be retained by the cylinder portion.

10. The shock absorber according to claim 7, wherein with the shock absorber being mounted between the two members, a partition member is disposed in the reservoir, the partition member including a partition wall adapted to limit a flow of the hydraulic fluid flowing upward from an inflow port leading to the reservoir after being transmitted through the damping force generation mechanism, and
    wherein the partition member includes a retaining portion enabling the partition member to be retained by the cylinder portion.

11. A separator tube for a shock absorber, wherein the separator tube is disposed around a cylinder sealingly containing hydraulic fluid,
    wherein the separator tube comprises a cylindrical sidewall defining an annular passage between the cylinder and the separator tube, the annular passage being in communication with the interior of the cylinder,
    wherein the separator tube further comprises a branch tube integrally formed on the cylindrical sidewall and substantially cylindrically protruding toward the radially outer side so as to define a passage in communication with the annular passage,
    wherein the branch tube is formed on the cylindrical sidewall of the separator tube by drawing processing,
    wherein the branch tube includes a curved portion and a cylindrical portion, the curved portion being formed on a proximal end of the branch tube so as to have curved inner and outer circumferences, the cylindrical portion being formed continuously from the curved portion toward a distal end of the branch tube so as to have a constant inner diameter, and
    wherein the outer diameter of the cylindrical portion is gradually reduced from the proximal end side toward the distal end side.

* * * * *